United States Patent
Mansukhani et al.

(10) Patent No.: US 10,656,930 B2
(45) Date of Patent: May 19, 2020

(54) DYNAMIC DEPLOYMENT TARGET CONTROL

(71) Applicant: Microsoft Technology Licensing, LLC, Redmond, WA (US)

(72) Inventors: Amesh Mansukhani, Redmond, WA (US); Christopher R. Hopkins, Black Diamond, WA (US); Shash Rajashekara, Sammamish, WA (US); Dhirendra Kumar Bhupati, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/129,354

(22) Filed: Sep. 12, 2018

(65) Prior Publication Data
US 2020/0081698 A1 Mar. 12, 2020

(51) Int. Cl.
*G06F 9/445* (2018.01)
*G06F 15/173* (2006.01)
*G06F 9/44* (2018.01)
*G06F 11/36* (2006.01)
*G06F 8/61* (2018.01)
*G06K 9/62* (2006.01)
*G06N 20/00* (2019.01)
*G06F 11/07* (2006.01)
*G06F 9/455* (2018.01)
*H04L 29/08* (2006.01)

(52) U.S. Cl.
CPC .............. *G06F 8/64* (2013.01); *G06K 9/6218* (2013.01); *G06N 20/00* (2019.01); *G06F 9/45533* (2013.01); *G06F 11/0709* (2013.01); *H04L 67/34* (2013.01)

(58) Field of Classification Search
CPC .... G06F 8/61; G06F 11/0709; G06F 9/45533; G06F 8/65; G06F 11/368; H04L 67/34; H04L 67/1087; H04L 67/2814; H04L 67/10; H04L 67/1008; H04L 41/5058; H04L 41/00; H04L 41/0853
See application file for complete search history.

(56) References Cited

U.S. PATENT DOCUMENTS

| | | | |
|---|---|---|---|
| 7,555,551 B1 | 6/2009 | McCorkendale et al. | |
| 7,693,983 B1 * | 4/2010 | Gupta | H04L 12/1471 709/221 |
| 7,779,406 B2 | 8/2010 | Blanding et al. | |

(Continued)

OTHER PUBLICATIONS

Jeffrey Fischer et al., Engage: a deployment management system, Jun. 11, 2016, 2012, [Retrieved on Jan. 3, 2020]. Retrieved from the internet: <URL: https://dl.acm.org/citation.cfm?id=2254096> 11 Pages (263-274) (Year: 2012).*

(Continued)

*Primary Examiner* — Anibal Rivera
(74) *Attorney, Agent, or Firm* — Christopher J. Volkmann; Kelly, Holt & Christenson, PLLC

(57) ABSTRACT

A set of devices is inventoried to identify components on the device. Usage information is also identified, indicating a level of usage of the different components. The set of devices is dynamically divided into different collections and deployment control signals are generated to control deployment of an item, onto the devices, based upon the identified collections.

20 Claims, 9 Drawing Sheets

(56) References Cited

U.S. PATENT DOCUMENTS

| | | | | |
|---|---|---|---|---|
| 8,099,478 | B2* | 1/2012 | Mimura | G06F 8/61 |
| | | | | 709/220 |
| 8,910,142 | B2 | 12/2014 | Valeriano et al. | |
| 9,104,497 | B2* | 8/2015 | Mortazavi | H04L 29/08144 |
| 9,244,671 | B2 | 1/2016 | Voronkov et al. | |
| 9,311,066 | B1 | 4/2016 | Garman et al. | |
| 9,575,738 | B1 | 2/2017 | Chopra et al. | |
| 9,582,261 | B2* | 2/2017 | Singh | H04W 4/60 |
| 10,331,438 | B2* | 6/2019 | Stopa | G06F 8/71 |
| 2004/0003266 | A1* | 1/2004 | Moshir | G06F 8/62 |
| | | | | 713/191 |
| 2007/0043860 | A1* | 2/2007 | Pabari | G06F 9/5072 |
| | | | | 709/224 |
| 2007/0192769 | A1* | 8/2007 | Mimura | G06F 8/61 |
| | | | | 719/316 |
| 2011/0047597 | A1* | 2/2011 | Mahaffey | G06F 21/564 |
| | | | | 726/3 |
| 2013/0097321 | A1* | 4/2013 | Tumbde | H04L 67/1008 |
| | | | | 709/226 |
| 2014/0040638 | A1* | 2/2014 | Barton | H04L 41/00 |
| | | | | 713/193 |
| 2014/0129715 | A1* | 5/2014 | Mortazavi | H04L 29/08144 |
| | | | | 709/226 |
| 2014/0317289 | A1* | 10/2014 | Shahpurwala | H04L 67/2814 |
| | | | | 709/225 |
| 2015/0058459 | A1* | 2/2015 | Amendjian | H04L 41/5058 |
| | | | | 709/223 |
| 2015/0106806 | A1* | 4/2015 | Reddy | G06F 9/45533 |
| | | | | 718/1 |
| 2015/0378716 | A1* | 12/2015 | Singh | H04W 4/60 |
| | | | | 717/172 |
| 2016/0055072 | A1* | 2/2016 | Baloch | G06F 11/368 |
| | | | | 714/38.1 |
| 2016/0092871 | A1* | 3/2016 | Gordon | H04L 63/0414 |
| | | | | 705/44 |
| 2016/0103671 | A1 | 4/2016 | Curran et al. | |
| 2016/0274893 | A1 | 9/2016 | Thomas et al. | |
| 2016/0274999 | A1* | 9/2016 | Florez-Larrahondo | |
| | | | | H04L 67/10 |
| 2018/0018154 | A1 | 1/2018 | Burns et al. | |
| 2018/0063700 | A1 | 3/2018 | Chandrasekaran | |
| 2018/0115603 | A1* | 4/2018 | Hu | H04L 67/1087 |
| 2018/0295030 | A1* | 10/2018 | Saha | H04L 67/34 |
| 2018/0295036 | A1* | 10/2018 | Krishnamurthy | H04L 41/0893 |
| 2018/0300180 | A1* | 10/2018 | Shepard | G06F 9/5055 |
| 2018/0316555 | A1* | 11/2018 | Salgueiro | H04L 41/0853 |
| 2019/0129711 | A1* | 5/2019 | Stopa | H04L 41/0853 |

OTHER PUBLICATIONS

Meriem Belguidoum et al., Analysis of deployment dependencies in software components, Apr. 23-27, 2006, [Retrieved on Jan. 3, 2020]. Retrieved from the internet: <URL: https://dl.acm.org/citation.cfm?id=1141445> 1 Pages (735-736) (Year: 2006).*

"Use groups to manage users and devices with Microsoft Intune", Retrieved from: https://technet.microsoft.com/fi-fi/library/dn646990.aspx, Retrieved on Jul. 30, 2018, 5 Pages.

"International Search Report and Written Opinion Issued in PCT Application No. PCT/US2019/038831", dated Aug. 12, 2019, 13 Pages.

Der Woude, Peter Van., "Automatically Assign Windows AutoPilot Deployment Profile to Windows AutoPilot Devices—More than Just ConfigMgr", Retrieved from: https://www.petervanderwoude.nl/post/automatically-assign-windows-autopilot-deployment-profile-to-windows-autopilot-devices/, Jun. 25, 2018, 13 Pages.

* cited by examiner

CREATE DEPLOYMENT PLAN  [CREATE] [CANCEL] — 240

Name — 242
[Update to latest ACME 1803]

Products and versions — 244
ACME clients, version 1803

Device groups
Selected (4) — 248

Readiness rules
Use defaults

Add your target groups from the table — 246
Don't see what you are looking for? Create your groups in Log Analytics.
Don't forget to refresh every time you create a new group.

+ Set as target Groups 1 selected ✗  12 of 49 results  1 2 3 4 5 Next Page

| | Name | Source | Devices |
|---|---|---|---|
| ● | Dynamic Group 1 Recommended | | 2717 |
| ○ | Dynamic Group 2 Recommended | | 17,012 |
| ○ | HP Computers | Operations Man.. | 530 |
| ○ | Dell Computers | Operations Man.. | 17,234 |
| ○ | Finance Dept | System Center C.. | 892 |
| ○ | HR Dept | System Center C.. | 12 |
| ○ | North America | System Center C.. | 81,232 |
| ○ | East Europe | System Center C.. | 75,091 |
| ○ | Senior Leadership | System Center C.. | 85 |
| ○ | IT Dept | System Center C.. | 135 |
| ○ | Admins | System Center C.. | 15 |
| ○ | Sales Dept | System Center C.. | 5,897 |

250 (braces around Dynamic Groups); 252 (braces around System Center entries); 254 (indicator at selected row)

FIG. 3

DYNAMIC DEPLOYMENT TARGET CONTROL

BACKGROUND

Computing systems are currently in wide use. Some computing systems host services or other computing system functionality for one or more tenants. Each tenant may be an organization that has a plurality of different users. Each of the different users may use one or more different devices in order to access the computing system.

The devices used by different users may, themselves, have different applications, security components, or other items. An administrative user normally manages deployment of the applications, security systems, or other items to the different devices used by the users in an organization or tenant.

In order to deploy or manage the devices in this way, the administrative user often imports, or creates, a representation of each device used by the organization in a management system and then identifies groups of devices for which the deployment is to occur, together.

In many current systems, the administrative user divides the devices into collections (or groups) based on one or more different criteria, such as the geographic location where the device resides, the department to which the user of the device belongs, and the different applications that may be installed on the devices.

The discussion above is merely provided for general background information and is not intended to be used as an aid in determining the scope of the claimed subject matter.

SUMMARY

A set of devices is inventoried to identify components on the device. Usage information is also identified, indicating a level of usage of the different components. The set of devices is dynamically divided into different collections and deployment control signals are generated to control deployment of an item, onto the devices, based upon the identified collections.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 shows one example of a user interface that can be generated to surface a suggestion of dynamically created device collections.

DETAILED DESCRIPTION

Figure 1:
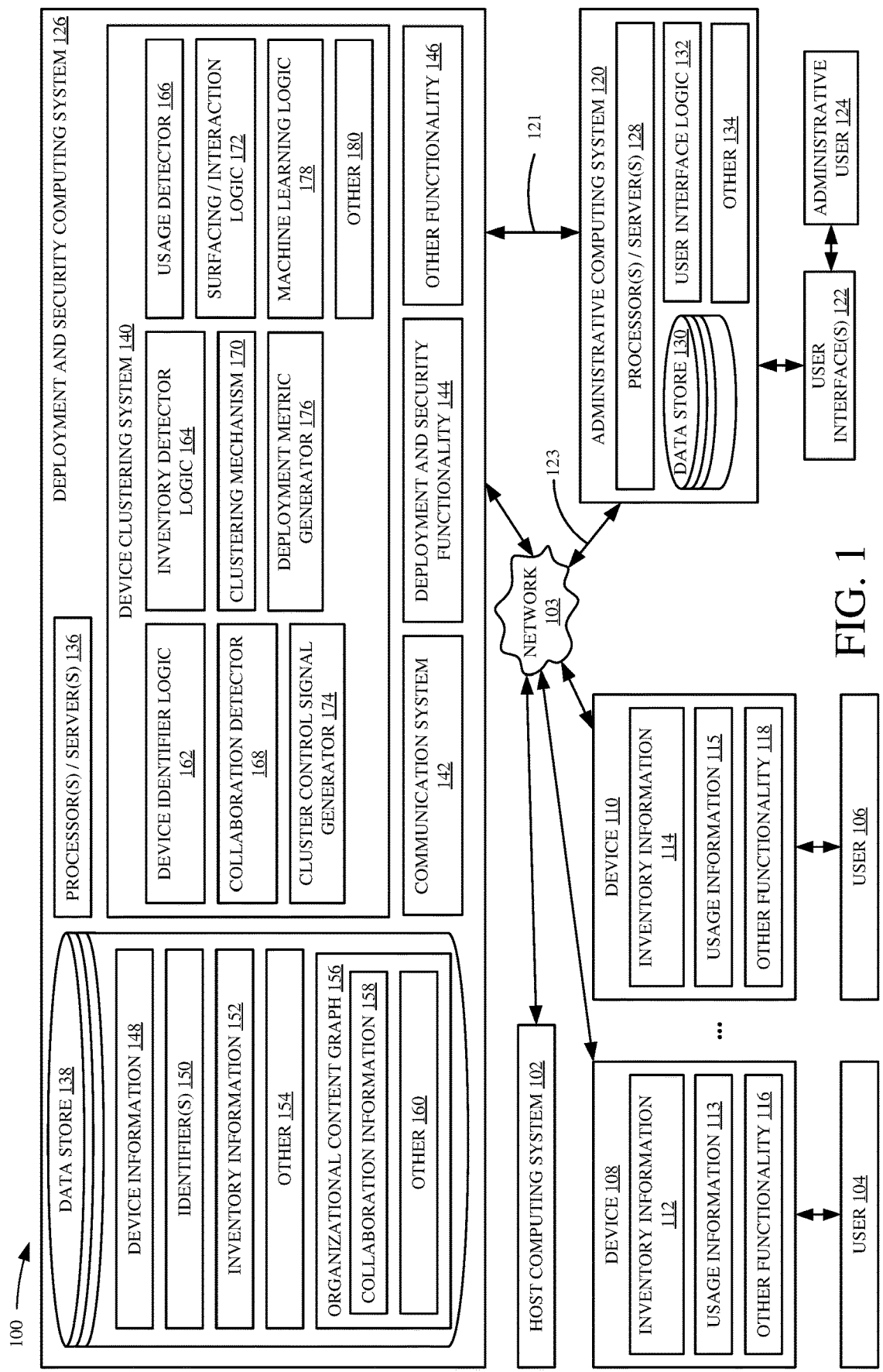
FIG. 1 is a block diagram of one example of a computing system architecture.

FIG. 1 is a block diagram of one example of a computing system architecture 100. Architecture 100 illustrates that a host computing system 102 can host services, applications, or other resources, for a tenant, or organization that may have a plurality of different users 104-106 that each use one or more different devices 108-110 in order to access the services or other items hosted by hosting computing system 102 over network 103. In one example, user devices 108-110 include inventory information 112-114, usage information 113-115, and they can include a wide variety of other device functionality 116-118.

The inventory information 112-114 may indicate a wide variety of different types of information, such as the type of the device it resides on, its make and model, different applications that are installed on the device, the operating system and other architecture information corresponding to the device, items that are currently running on the device, add-ins installed on the device, settings and different functions that are enabled on the device, among other things. Usage information 113-115 illustratively identifies a level of usage of the various items on the device. For instance, it can identify what functionality is used on the device (such as speech recognition/synthesis functionality, accessibility functions, etc.). It can also identify which particular applications are used (as opposed to just identifying which applications are installed). It can identify the level of usage of those applications as well (such as the frequency of usage, the recency of usage, the volume of usage, etc.).

Devices 108-110 illustratively generate user interfaces for interaction by users 104-106, respectively. Users 104-106 thus illustratively interact with the user interfaces in order to control and manipulate devices 108-110 and some items of host computing system 102.

Network 103 can include a wide area network, a local area network, a near field communication network, a cellular communication network, or a wide variety of other networks or combinations of networks. Thus, host computing system 102 and devices 108-110 illustratively have communication systems that allow them to communicate with one another over network 103.

FIG. 1 also shows that, in one example, an administrative computing system 120 illustratively generates user interfaces 122 for interaction by an administrative user 124. Administrative user 124 illustratively interacts with user interfaces 122 in order to control and manipulate items on administrative computing system 120 so that administrative user 124 can manage deployment, security issues, and other administrative processes with respect to devices 108-110. In one example, administrative user 124 illustratively manages the deployment of applications, security components, or other items, to devices 108-110 using deployment and security computing system 126. Before describing the operation of administrative computing system 120 and deployment and security computing system 126 in more detail, a brief description of some of the items on those computing systems, and their operation, will first be provided.

Administrative computing system 120 illustratively includes one or more processors or servers 128, data store 130, user interface logic 132, and it can include a wide variety of other administrative computing system functionality 134. User interface logic 132 illustratively generates user interfaces 122 and detects user interaction with those interfaces. It can provide an indication of the user interactions to other items in administrative computing system 120, to deployment and security computing system 126 or to other items in architecture 100. In one example, administrative computing system 120 includes components and functionality that are used to manage the various devices 108-110. In another example, it includes a client component that is used to interact with another management system on host computing system 102, or deployment and security computing system 126.

In the example illustrated in FIG. 1, deployment and security computing system 126 is used by administrative user 124 to control the deployment of items to devices 108-110 and to preform security operations on those devices. Collectively, these can be referred to as deployment operations. System 126 is shown separately from administrative computing system 120 and host computing system 102. However, it will be appreciated that it can be deployed on either computing system 120 or host computing system 102, or different portions can be deployed on different computing systems as well. Also, as shown in FIG. 1, administrative computing system 120 can interact with deployment and security computing system 126 either directly (as indicated by arrow 121) or through network 103 (as indicated by arrow 123).

In the example shown in FIG. 1, deployment and security computing system 126 illustratively includes one or more processors or servers 136, data store 138, device clustering system 140, communication system 142, deployment and security functionality 144 and it can include a wide variety of other functionality 146.

Data store 138 illustratively includes device information 148 that corresponds to each of devices 108-110 which administrative user 124 is managing. The device information 148 can include a device identifier 150, inventory information 152, and it can include a wide variety of other information 154. It will be noted that the inventory information 152 can be the same or different information from inventory information 112-114 on each of the devices 108-110. Similarly, the inventory information can be stored either on devices 108-110 or on deployment and security computing system 126, or it can be stored in both places. The device information illustratively includes the device type, the device make and model corresponding to the device identifier 150. It can include an identifier for the installed applications, that are installed on the corresponding device, the operating system and other architecture information corresponding to the device, items currently running on the device, add-ins disposed on the device, an indication of how the various settings on the device is set, and what functionality (e.g., speech recognition, speech synthesis, accessibility, etc.) are being used on the device. It can include other information as well.

In the example illustrated in FIG. 1, data store 138 also illustratively includes an organizational content graph 156. Organizational content graph 156 can be stored on host computing system 102 or on system 126 or elsewhere. It illustratively identifies items that are used by users of the host computing system 102, such as documents, slide presentations, spreadsheet documents, etc., that are created and accessed by the various users 104-106 and connections between those items of content. The connections can indicate relationships, such as users that have accessed, authored, edited, or otherwise interacted with the items of content. The items of content can include representations of meetings (such as meeting requests, scheduling items, etc.) or other items of content as well.

Organizational content graph 156 can include collaboration information 158 which indicates the particular users 104-106 that are collaborating on items of content, or that frequently meet together, have teleconferences, or video conferences, or that collaborate on documents (such as by accessing the same documents), communicate with one another (using electronic mail, messaging, cellular communication, etc.), or otherwise collaborate with one another.

The organizational content graph 156 can include an organization structure which identifies the roles for the various users 104-106, how they are grouped in departments or other groups, the management structure of the organization, and a wide variety of other information. The other information is indicated by block 160 in the block diagram of FIG. 1.

Communication system 142 illustratively allows computing system 126 to communicate over network 103 with the other items in FIG. 1. Therefore, in one example, communication system 142 is configured to communicate over whatever type of network 103 is used for communication.

Deployment and security functionality 144 illustratively includes computing system functionality that can be accessed by administrative user 124, and used to deploy applications, security components, or other items to devices 108-110. These are referred to as deployment operations. In one example, administrative user 124 identifies collections of devices 104-106 for which deployment operations should all take place at the same time. Therefore, device clustering system 140 illustratively identifies certain characteristics or aspects corresponding to devices 108-110 and dynamically generates suggested clusters for deployment and security functionality 144. The suggested clusters can be surfaced for selection by administrative user 124 during a deployment or security operation.

By way of example, it may be that there are a variety of different devices 108-110 that are reused by users 104-106 that collaborate with one another regularly. It may thus be beneficial for the devices used by those users to all have a deployment performed at the same time. This is so that the users that closely collaborate with one another can have devices that have the same items deployed to them, at the same time, thus reducing the likelihood that the devices will somehow be incompatible or unable to perform collaboration functions as desired by the users. Similarly, it may be that a deployment may affect certain applications more than others on devices 108-110. Therefore, the devices may be clustered based on how heavily the users use those applications that are highly affected. It may be that the users that use those applications most would like the deployment to be performed on their devices first, or vice versa. These are only examples of the clustering criteria that can be used by a clustering system 140 in order to identify clusters or groups of devices 108-110 for which deployment is to be performed at the same time. Others are described below.

In the example shown in FIG. 1, device clustering system 140 illustratively includes device identifier logic 162, inventory detector logic 164, usage detector 166, collaboration detector 168, clustering mechanism 170, surfacing/interaction logic 172, cluster control signal generator 174, deployment metric generator 176, machine learning logic 178, and it can include a wide variety of other items 180. Device identifier logic 162 identifies one or more a devices for which information is to be detected, in order to cluster the devices 108-110. Inventory detector logic 164 detects the inventory information corresponding to each device that has been identified. The inventory information can be information 112-114 on the devices 108-110, themselves, or it can be inventory information 152 stored in data store 138, or it can be a combination of those items of inventory information. More examples of the types of inventory information that can be detected are described below.

Usage detector 166 illustratively detects a usage of the various applications and other components or functionality that is installed on the devices. For instance, it can detect which applications and functionality are used, the level of usage (such as the frequency, recency, volume of usage, etc.), or other usage indicators characterizing the usage of the applications or other components on a particular device.

Collaboration detector 168 detects which other devices the device under analysis collaborates. For instance, if user 104 has a mobile device and a desktop device, it may be that user 104 uses the desktop device to collaborate with user 106 on various projects or items of content. It may be that user 104 uses both devices to collaborate with user 106 or that user 104 uses one device to collaborate with user 106, and another device to collaborate with another user. All of this information can be detected by collaboration detector 168. It can detect the information by accessing collaboration information 158 on organizational content graph 156. It can detect the information by examining items of content in graph 156, or stored in host computing system 102, and identifying which users access those items of content. It can be detected by detecting which users communicate with one another, meet with one another, have collaboration modes enabled on their devices, or in other ways.

Clustering mechanism 170 illustratively uses the inventory information, usage information, and collaboration information, to cluster devices 108-110 into clusters where a particular deployment operation is to be preformed on all devices in a given cluster, at the same time. The operation of clustering mechanism 170 is described in greater detail below as well.

Surfacing/interaction logic 172 illustratively surfaces a representation of the different clusters identified by clustering mechanism 170, for a given deployment, to administrative user 124. It can do this directly or using user interface logic 132. It also illustratively identifies administrative user interactions with the surfaced clusters to determine whether the user has selected one or more of the suggested clusters for a deployment or a security operation. Again, it can do this by directly detecting those user interactions or it can receive an indication of the user interactions from user interface logic 132.

Once administrative user 124 has selected a cluster for a deployment or security operation, then cluster control signal generator 174 illustratively generates control signals and provides them to deployment and security functionality 144 so that the deployment or security operation is performed, for all devices in the selected cluster, at essentially the same time. It can be performed simultaneously on all of those devices, or in near real time, on those devices, once the deployment is authorized or started by administrative user 124.

Deployment metric generator 176 illustratively generates a deployment performance metric indicative of the performance of a particular deployment or security operation on the clustered devices. For instance, it may generate a time metric indicating an amount of time that the deployment took to complete for a given cluster. It may identify particular devices in a given cluster for which the deployment took longer, or for which problems were encountered during the deployment. It can identify other information or metrics indicative of the deployment performance on the selected cluster as well.

The information generated by deployment metric generator 176 can be provided to machine learning logic 178. Machine learning logic 178 can consider the performance of the deployment, as indicated by the deployment metrics generated by generator 176, and revise the clustering mechanism 170 in order to enhance the deployment performance. For instance, if a particular deployment to a cluster took an unusually long time, and there was only a small subset of the devices in that cluster that took a longer time than the remainder of the devices, then machine learning logic 178 can mine the devices for additional criteria that can be used in clustering, so that the longer latency devices are not clustered with the shorter latency devices, for this type of deployment operation, as often. This is just one example of how deployment performance metrics can be used by machine learning logic 178 in order to modify clustering mechanism 170.

Figure 2A:
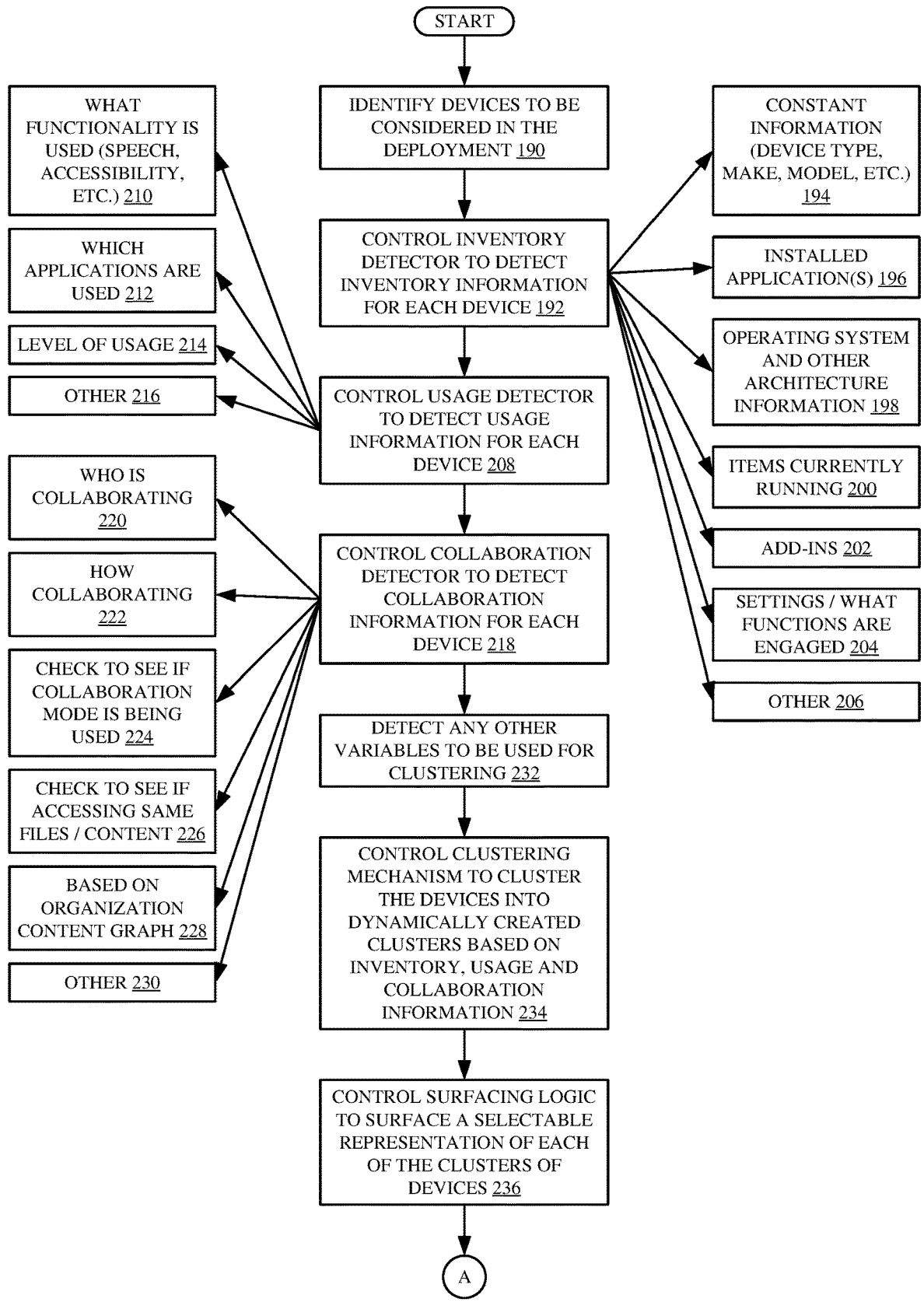
FIGS. 2A and 2B (collectively referred to herein as FIG. 2) illustrate a flow diagram showing one example of dynamically dividing devices into sets or collections of devices for deployment control.
Figure 2B:
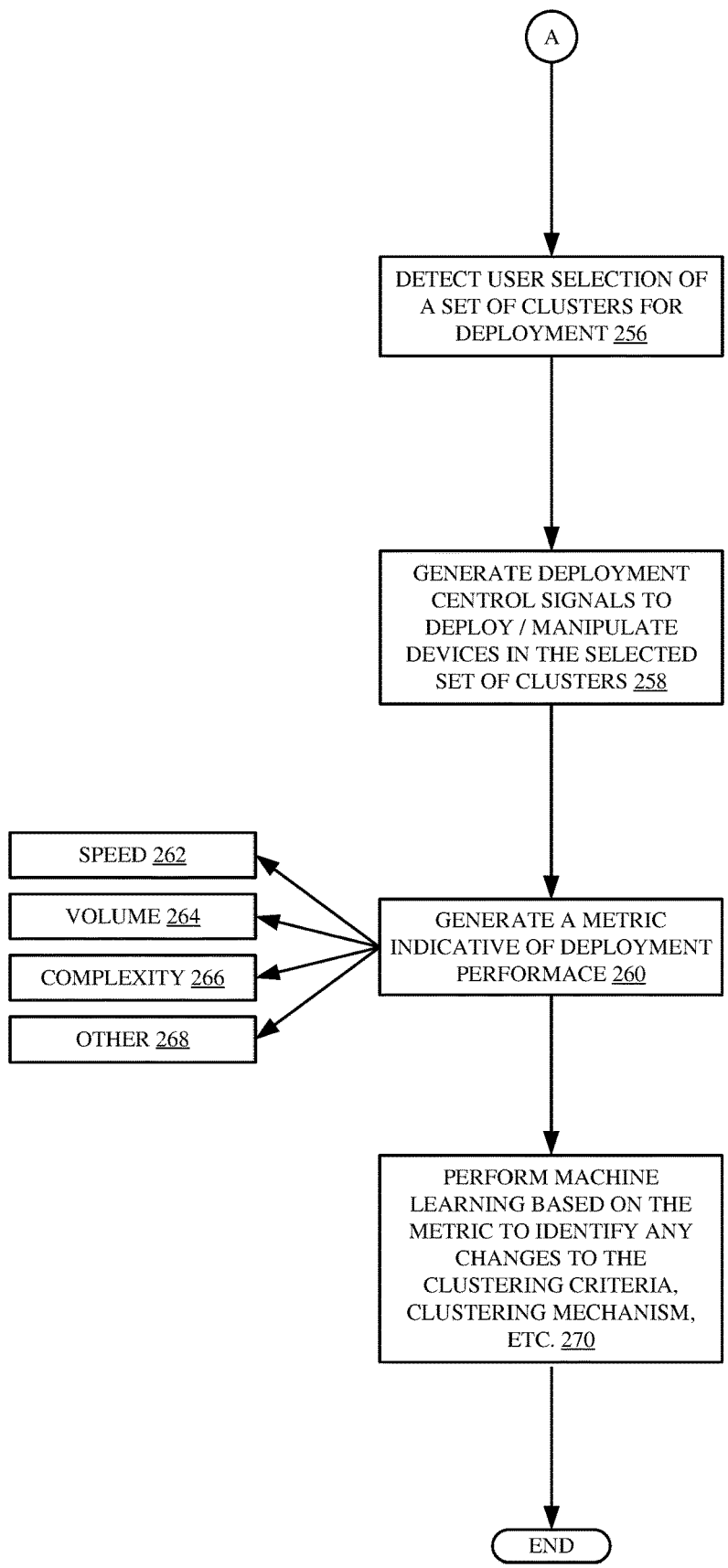

FIGS. 2A-2B (collectively referred to herein as FIG. 2) illustrate a flow diagram showing one example of the operation of architecture 100, and in particular device clustering system 140, in clustering devices 108-110 into clusters for selection by administrative user 124, so that a deployment operation can be performed on all devices in a selected cluster, at the same time. Device identifier logic 162 first identifies the devices for which a deployment is to take place. This is indicated by block 190 in the flow diagram of FIG. 2. For instance, administrative user 124 can input device identifiers 150 for all devices 108-110 that are to be the subject of the new deployment or security operation. This may be the overall set of devices 108-110 that are to receive the deployment or security operation. The device identifiers (or other identifying information corresponding to the devices) can be imported automatically, from another computing system, or the devices can be identified by device identifier logic 162 in other ways as well.

The processors or servers 136 then control inventory detector logic 164 in order to detect inventory information for each of the devices identified by device identifier logic 162. This is indicated by block 192 in the flow diagram of FIG. 2. Inventory detector logic 164 can detect constant inventory information 194, such as device type, device make, model, etc. It can also detect more dynamic information or variable information, such as the installed applications 196 on the device, the operating system and other architecture information 198 corresponding to the device, items (e.g., applications, widgets, etc) 200 that are currently running on the device, add-ins 202 that have been installed on the device, and the value of the various settings, such as what functions are enabled on the device. This is indicated by block 204. The inventory information can include a wide variety of other information 206, as well.

Processors or servers 136 then control usage detector 166 to detect usage information for each of the devices under consideration. This is indicated by block 208 in the flow diagram of FIG. 2. Detector 166 can access the individual devices 108-110, or other information that may be stored in host computing system 102 or system 126 to identify usage. For instance, if a representation of each device 108-110 is stored on host computing system 102 or 126, and that representation identifies usage information, which may be intermittently updated, then the information can be obtained from those computing systems. In another example, detector 166 accesses or communicates with devices 108-110 in order to obtain the usage information 113-115 from those devices. The usage information can identify what functionality is used on the device, such as whether the speech recognition and accessibility functionality is used, etc. This is indicated by block 210. The usage information can identify which applications are used, as indicated by block 212. It can identify the level of usage of the various items on the device, as indicated by block 214. For instance, the level of usage may indicate how frequently a function or application is used, how recently it has been used, the volume of usage (such as the number of times it is used or the length of time it is used over a given period), among other things. Detector 166 can detect a wide variety of other usage information as well. This is indicated by block 216.

Processors or servers 136 then control collaboration detector 168 in order to detect collaboration information corresponding to each device. This is indicated by block 218. Detector 168 can detect information, such as which particular users are collaborating, or which devices 108-110 are being used for collaboration. This is indicated by block 220. This can be done, for instance, by identifying which particular content items are being accessed by the same people (or by the same sets of devices). Detector 166 can detect how the devices or individuals are collaborating as well. This is indicated by block 222. For instance, it can detect whether the individuals are communicating with one another over e-mail, messaging, using an electronic meeting system, scheduled meetings, using collaboration functionality within certain applications, or otherwise. Detector 166 can check to determine whether devices or applications have a collaboration mode set so that users can collaborate with one another on certain items of content produced by the applications. This is indicated by block 224. Detector 166 can examine documents or other content items that are accessed by a particular user or device and determine which other users or devices are accessing that same document or content item. This is indicative of a collaboration as well, and it is indicated by block 226.

It may be that the organizational content graph 156 has collaboration information 158 which identifies users that are collaborating or devices that are used in collaboration. Accessing the organizational content graph is indicated by block 228. Detector 166 can detect collaboration information in a wide variety of other ways as well, and this is indicated by block 230.

It may also be that device clustering system 140 detects other variables that are used in clustering. For instance, machine learning logic 178 may, over time, mine or discover other variables that are useful in generating device clusters for deployment operations. Detecting any other variables to be used for clustering the devices is indicated by block 232 in the flow diagram of FIG. 2.

Processors or servers 136 then control clustering mechanism 170 in order to cluster the devices into dynamically created clusters based upon the inventory, usage, collaboration and any other information or clustering criteria. This is indicated by block 234. In one example, clustering mechanism 170 is illustratively a clustering or classification component or algorithm that clusters or classifies the devices into clusters, based upon the clustering criteria or variables that are detected. Therefore, it illustratively classifies devices 108-110 into groups or clusters based upon the inventory information, the usage information, and the collaboration information (and possibly other information as well). It can include a neural network, decision tree classifier or often clustering mechanism.

Once the devices are clustered into the dynamically created groups (or clusters), surfacing/interaction logic 172 illustratively controls administrative computing system 120 to surface the suggested clusters for selection by administrative user 124. The clusters can be surfaced in a wide variety of different ways. For instance, the clusters can be identified by a single entry in a list of selectable clusters. The entry can be actuatable so that when the administrative user 124 actuates the entry, user 124 is navigated to a more full description of the different devices in that cluster. The selectable clusters can be surfaced in other ways as well. Controlling the surfacing logic to surface a selectable representation of each of the clusters of devices is indicated by block 236.

One example interface for surfacing the clusters is illustrated in FIG. 3. FIG. 3 shows an example of a user interface display 240 that is surfaced for administrative user 124 in order for administrative user 124 to generate a deployment plan, by identifying clusters of devices for which a deployment operation is to take place, at the same time. In the example shown in FIG. 3, display 240 illustratively includes a deployment plan name identifier 242 which, as illustrated, can be a text box into which administrative user 124 enters a name of a particular deployment. It can include a products and versions identifier 244 that identifies the products and versions for which the deployment is targeted. When the user actuates identifier 244, a display pane 246 illustratively shows an indication of those devices. Display 240 can also include a device groups identifier 248. When the user actuates device groups identifier 248, display pane 246 illustratively shows the various device groups that are available for selection by administrative user 124.

In one example, the device groups include a set of automatically generated groups 250 and manually generated groups 252. In the example shown in FIG. 3, the automatically generated groups 250 include dynamic group 1 and dynamic group 2. Each of the groups illustratively has a selector mechanism 254 that corresponds to it, that the user 124 can actuate in order to select that group for the deployment. The automatically generated groups 250 are those illustratively generated by device clustering system 140 and surfaced using surfacing/interaction logic 172. It will be noted that multiple clusters can be selected as well.

Once the user has selected one or more of the clusters in the automatically generated groups 250 or other groups 252, surfacing/interaction logic 172 detects user selection of a set of clusters for deployment. This is indicated by block 256 in the flow diagram of FIG. 2. For example, and as shown in FIG. 3, dynamic group 1 has been selected by the user by actuating selection actuator 254.

The user can then finish creating the deployment plan, and launch that plan (or execute it) by providing a suitable user input. Once the administrative user begins executing the deployment plan, then the deployment or security operation that is the subject of the plan will be deployed or performed on the devices in the selected groups or clusters. Thus, when the plan is to be executed, cluster control signal generator 174 generates deployment control signals and provides them to deployment and security functionality 144 to deploy a component to the devices in the selected group, or to manipulate those devices to perform a security operation, or to perform some other deployment operation. Generating the deployment control signals to manipulate the devices in the selected set of clusters is indicated by block 258 in the flow diagram of FIG. 2.

As the deployment is proceeding, deployment metric generator 176 illustratively monitors deployment and security functionality 144 and generates a metric indicative of the deployment performance. This is indicated by block 260 in the flow diagram of FIG. 2. The deployment performance metric can be a measure of deployment speed 262 which indicates how long it took to perform the deployment or security operation to all devices in the selected set of clusters. It can be indicative of the volume of devices, or the volume of software components that are deployed to those devices, or it can be indicative of other volume measures. This is indicated by block 264. The deployment performance metric can be indicative of the complexity of the deployment (such as whether it is a deployment of an entirely new application, or a relatively simple bug fix, etc.). Measuring deployment performance in terms of complexity is indicated by block 266. The deployment performance metric can be indicative of a wide variety of other information as well, and this is indicated by block 268.

The deployment performance metric generated by generator 176 is then fed back to machine learning logic 178 which performs machine learning based on that metric in order to identify any changes to the clustering criteria used by clustering mechanism 170, to the clustering mechanism or algorithm itself, etc. Performing machine learning is indicated by block 270 in the flow diagram of FIG. 2.

It can thus be seen that the present system improves the performance of the deployment computing system, itself. It automatically detects characteristics of the various devices for which a deployment is to be made, and usage information relative to those devices. It then clusters the devices based upon the characteristics identified and surfaces those clusters for user selection. Once one or more clusters are selected for deployment, deployment control signals are generated to control the deployment system to perform the deployment or security operations on the devices in that cluster, at the same time. This enhances the ability of the deployment system to complete a deployment quickly and accurately. It also greatly enhances the user experience in that the deployment is performed on user devices for users that use the same types of things, and collaborate with one another, at substantially the same time.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
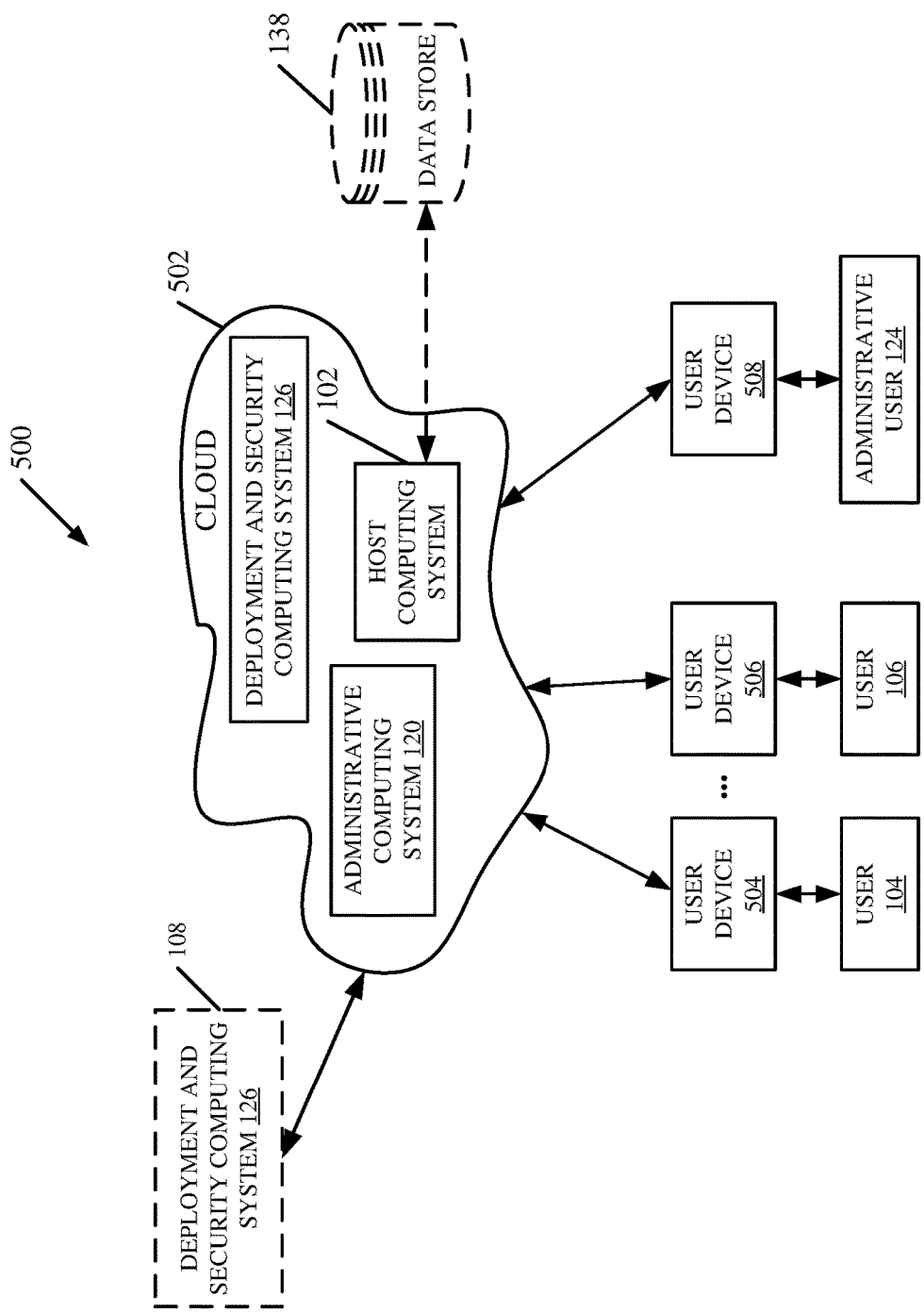
FIG. 4 is a block diagram showing one example of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that host computing system 102, deployment and security computing system 126 and administrative computing system 120, or other items, can be located in cloud 502 (which can be public, private, or a combination where portions are public while others are private). Therefore, uses 104-106 and 124 uses a user devices 504, 506 and 508 to access those systems through cloud 502.

FIG. 4 also depicts another example of a cloud architecture. FIG. 4 shows that it is also contemplated that some elements can be disposed in cloud 502 while others are not. By way of example, data store 138 can be disposed outside of cloud 502, and accessed through cloud 502. In another example, computing system 126 (or other items) can be outside of cloud 502. Regardless of where they are located, they can be accessed directly by devices 504, 506 and 508 through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
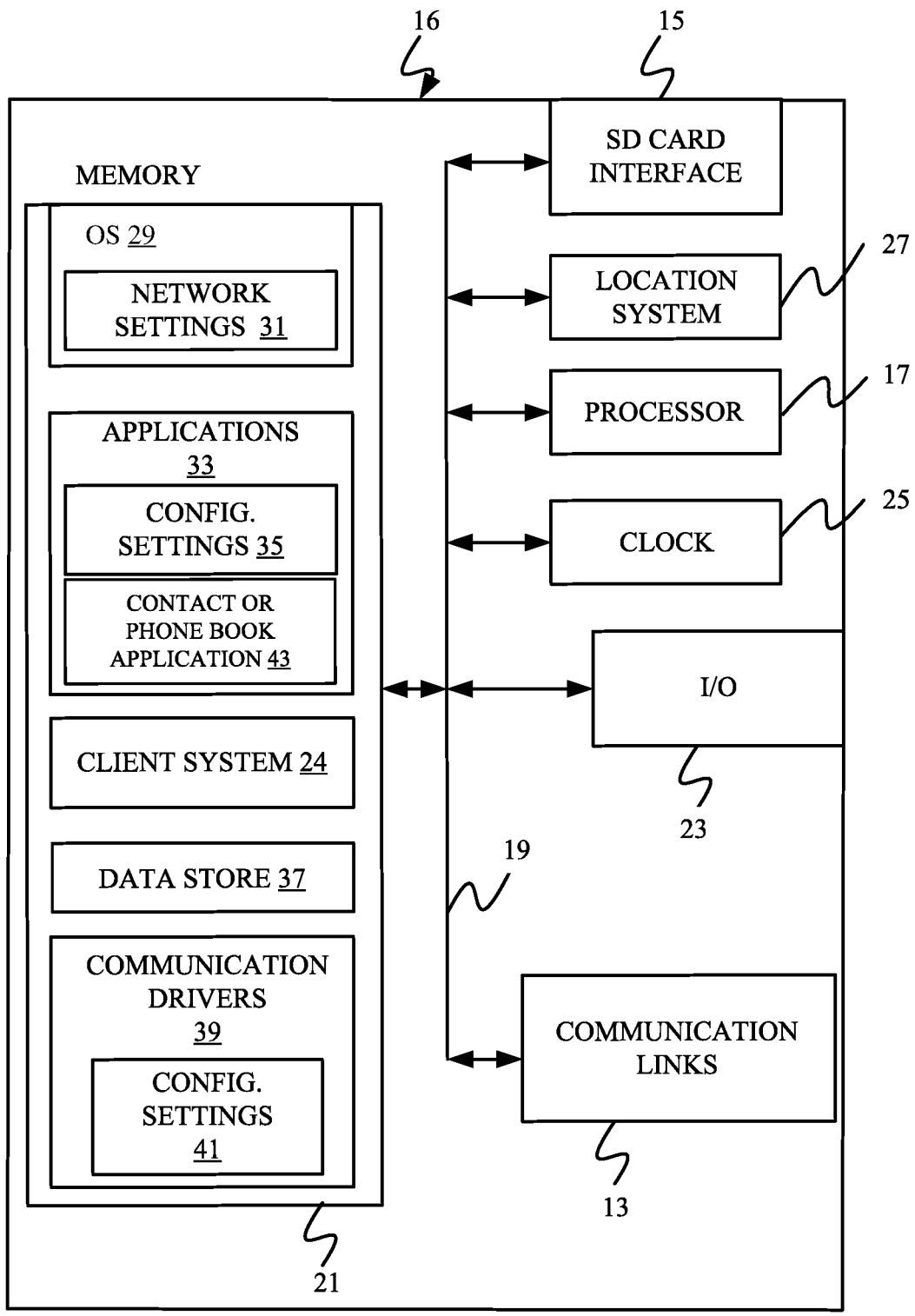
FIGS. 5-7 show examples of mobile devices that can be used in the architectures shown in the previous figures.
Figure 6:
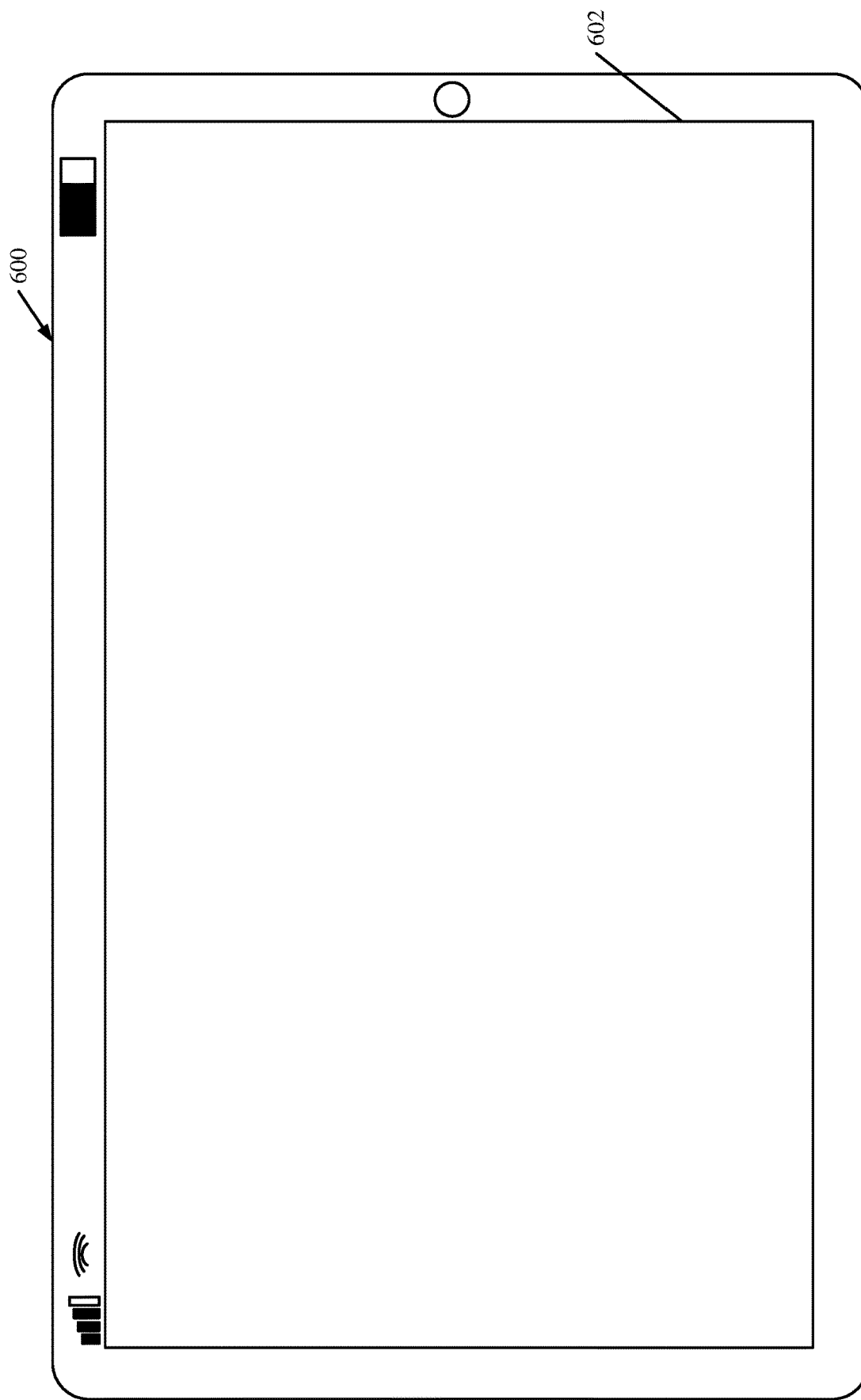
Figure 7:
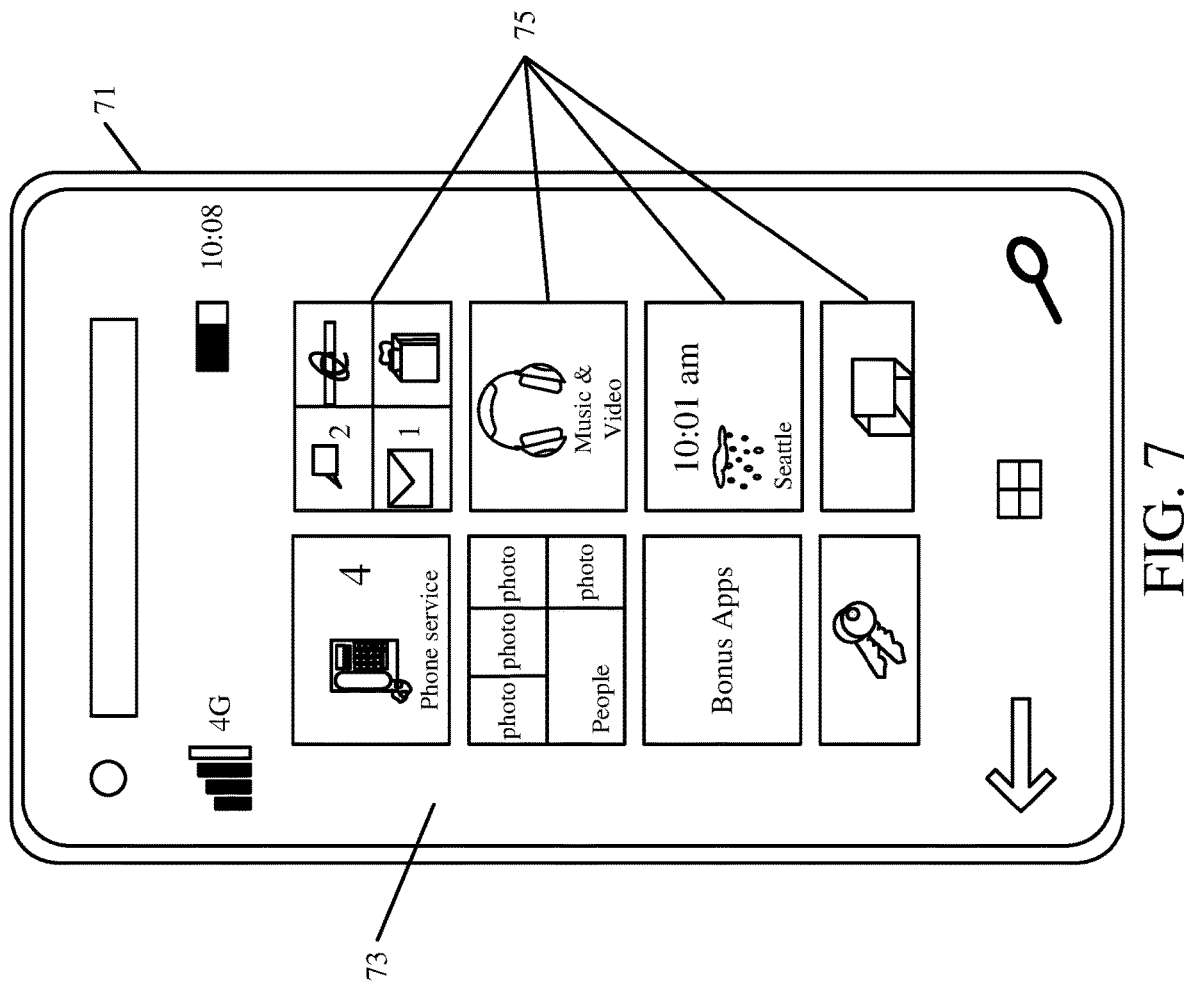

FIG. 5 is a simplified block diagram of one illustrative example of a handheld or mobile computing device that can be used as a user's or client's handheld device 16, in which the present system (or parts of it) can be deployed. FIGS. 6-7 are examples of handheld or mobile devices. These devices can be used in the architecture shown in the previous FIGS.

FIG. 5 provides a general block diagram of the components of a client device 16 that can run components computing system 102 or one of the user devices or that interacts with architecture 100, or all of the above. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
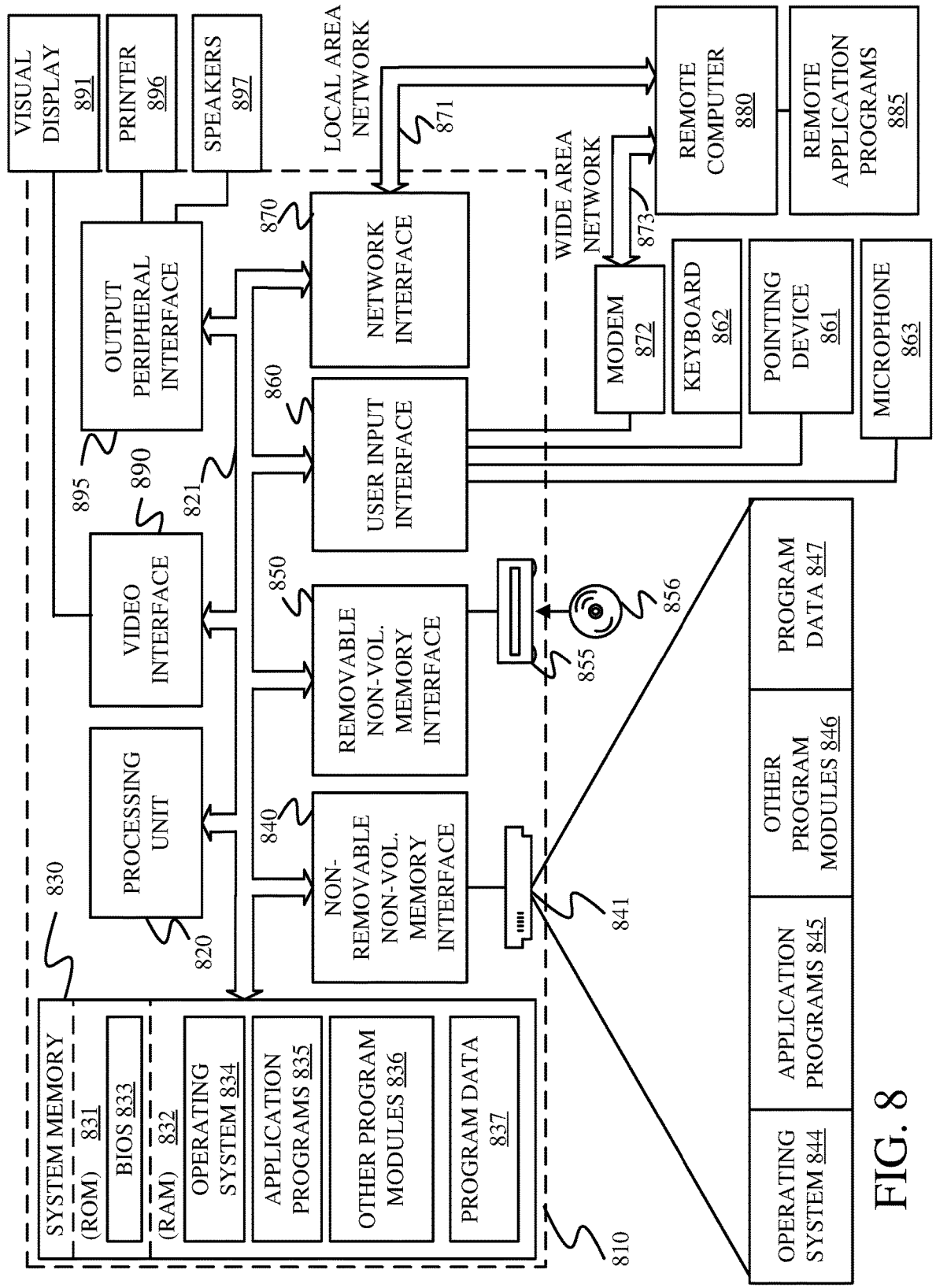
FIG. 8 is a block diagram showing one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a processor;
deployment functionality that performs a deployment operation to deploy a computing component;
inventory detector logic that identifies inventory information corresponding to each device, of a plurality of different devices in a set of devices, the inventory information for a given device including an indication of applications installed on the given device;
a usage detector that detects usage information corresponding to each of the devices in the set of devices, the usage information for the given device being indicative of usage of the applications installed on the given device;
a clustering mechanism that divides the plurality of different devices into clusters based on the inventory information and usage information corresponding to each of the plurality of different devices; and
a cluster control signal generator that generates a cluster control signal based on a user-selected cluster to control the deployment functionality to perform the deployment operation on the devices in the user-selected cluster.

Example 2 is the computing system of any or all previous examples, and further comprising:
a collaboration detector configured to detect collaboration information corresponding to each of the devices in the set of devices, the collaboration information for the given device being indicative of other devices in the set of devices that the given device performs collaborative operations with.

Example 3 is the computing system of any or all previous examples, wherein the clustering mechanism is configured to divide the plurality of different devices into the set of clusters based on the collaboration information corresponding to each of the plurality of different devices.

Example 4 is the computing system of any or all previous examples, and further comprising:
device identifier logic configured to identify the plurality of devices in the set of devices.

Example 5 is the computing system of any or all previous examples, wherein the inventory detector logic is configured to access each of the devices in the set of devices to identify the inventory information.

Example 6 is the computing system of any or all previous examples, wherein the collaboration detector is configured to access an organization content graph to identify the collaboration information.

Example 7 is the computing system of any or all previous examples, wherein the usage detector is configured to generate a usage metric for each given device indicative of a level of usage of each of the applications installed on the given device and wherein the clustering mechanism is configured to divide the plurality of different devices into clusters based on the usage metric.

Example 8 is the computing system of any or all previous examples, wherein the usage detector is configured to generate, as the usage information for each given device, information indicative of different functionality that is used on the given device.

Example 9 is the computing system of any or all previous examples, wherein the inventory detector logic is configured to identify, as a portion of the inventory information for each given device, add-ins installed on the given device.

Example 10 is the computing system of any or all previous examples, and further comprising:
a deployment performance metric generator configured to generate a deployment performance metric indicative of a deployment speed at which the deployment operation is performed on the devices in the user-selected cluster; and
machine learning logic configured to perform machine learning based on the deployment performance metric to obtain a machine learning result and to modify the clustering mechanism based on the machine learning result.

Example 11 is a computer implemented method of controlling a deployment operation, comprising:
identifying inventory information corresponding to each device, of a plurality of different devices in a set of devices, the inventory information for a given device, of the set of devices, including an indication of applications installed on the given device;
detecting usage information corresponding to each of the devices in the set of devices, the usage information for the given device being indicative of usage of the applications installed on the given device;
dividing the plurality of different devices into clusters based on the inventory information and usage information corresponding to each of the plurality of different devices; and
generating a cluster control signal based on a user-selected cluster to control deployment functionality to perform the deployment operation on the devices in the user-selected cluster.

Example 12 is the method of any or all previous examples, and further comprising:
detecting collaboration information corresponding to each of the devices in the set of devices, the collaboration information for the given device being indicative of other devices in the set of devices that the given device performs collaborative operations with.

Example 13 is the method of any or all previous examples, wherein dividing the plurality of different devices into clusters comprises:
dividing the plurality of different devices into the set of clusters based on the collaboration information corresponding to each of the plurality of different devices.

Example 14 is the method of any or all previous examples, wherein identifying inventory information comprises:
accessing each of the devices in the set of devices to identify the inventory information.

Example 15 is the method of any or all previous examples, wherein detecting collaboration information comprises:
accessing an organization content graph to identify the collaboration information.

Example 16 is the method of any or all previous examples, wherein detecting usage information comprises:
generating a usage metric for each given device indicative of a level of usage of each of the applications installed on the given device and wherein dividing the plurality of different devices into clusters comprises dividing the plurality of different devices into clusters based on the usage metric.

Example 17 is the method of any or all previous examples, wherein detecting usage information comprises:
 generating, as the usage information for each given device, information indicative of different functionality that is used on the given device.

Example 18 is the method of any or all previous examples, wherein identifying inventory information comprises:
 identifying, as a portion of the inventory information for each given device, add-ins installed on the given device.

Example 19 is the method of any or all previous examples, and further comprising:
 generating a deployment performance metric indicative of a deployment speed at which the deployment operation is performed on the devices in the user-selected cluster;
 performing machine learning based on the deployment performance metric to obtain a machine learning result; and
 modifying the clustering mechanism based on the machine learning result.

Example 20 is a computing system, comprising:
 a processor;
 deployment functionality that performs a deployment operation to deploy a computing component;
 inventory detector logic that identifies inventory information corresponding to each device, of a plurality of different devices in a set of devices, the inventory information for a given device including an indication of applications installed on the given device;
 a usage detector that detects usage information corresponding to each of the devices in the set of devices, the usage information for the given device being indicative of usage of the applications installed on the given device;
 a collaboration detector configured to detect collaboration information corresponding to each of the devices in the set of devices, the collaboration information for the given device being indicative of other devices in the set of devices that the given device performs collaborative operations with;
 a clustering mechanism that divides the plurality of different devices into clusters based on the inventory information, the usage information and the collaboration information corresponding to each of the plurality of different devices; and
 a cluster control signal generator that generates a cluster control signal based on a user-selected cluster to control the deployment functionality to perform the deployment operation on the devices in the user-selected cluster.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
 a processor;
 deployment functionality that performs a deployment operation to deploy a computing component;
 inventory detector logic that identifies inventory information corresponding to each device, of a plurality of different devices in a set of devices, the inventory information for a given device including an indication of applications installed on the given device;
 a usage detector configured to:
  detect usage information corresponding to each of the devices in the set of devices, the usage information for the given device being indicative of usage of the applications installed on the given device; and
  generate a usage metric, for each given device, indicative of a level of usage of each of the applications installed on the given device;
 a clustering mechanism that divides the plurality of different devices into clusters based on the inventory information and the usage metric corresponding to each of the plurality of different devices; and
 a cluster control signal generator that generates a cluster control signal based on a user-selected cluster to control the deployment functionality to perform the deployment operation on the devices in the user-selected cluster.

2. The computing system of claim 1, and further comprising:
 a collaboration detector configured to detect collaboration information corresponding to each of the devices in the set of devices, the collaboration information for the given device being indicative of other devices in the set of devices that the given device performs collaborative operations with.

3. The computing system of claim 2, wherein the clustering mechanism is configured to divide the plurality of different devices into the set of clusters based on the collaboration information corresponding to each of the plurality of different devices.

4. The computing system of claim 3, and further comprising:
 device identifier logic configured to identify the plurality of devices in the set of devices.

5. The computing system of claim 1, wherein the inventory detector logic is configured to access each of the devices in the set of devices to identify the inventory information.

6. The computing system of claim 2, wherein the collaboration detector is configured to access an organization content graph to identify the collaboration information.

7. The computing system of claim 1, wherein the level of usage of each particular application, of the applications installed on the given device, comprises one or more of:
 a frequency of usage of the particular application,
 a recency of usage of the particular application, or
 a volume of usage of the particular application.

8. The computing system of claim 1, wherein the usage detector is configured to generate, as the usage information for each given device, information indicative of different functionality that is used on the given device.

9. The computing system of claim 1, wherein the inventory detector logic is configured to identify, as a portion of the inventory information for each given device, add-ins installed on the given device.

10. The computing system of claim 1, and further comprising:
 a deployment performance metric generator configured to generate a deployment performance metric indicative of a deployment speed at which the deployment operation is performed on the devices in the user-selected cluster; and
 machine learning logic configured to perform machine learning based on the deployment performance metric to obtain a machine learning result and to modify the clustering mechanism based on the machine learning result.

11. A computer implemented method of controlling a deployment operation, the method comprising:
identifying inventory information corresponding to each device, of a plurality of different devices in a set of devices, the inventory information for a given device, of the set of devices, including an indication of applications installed on the given device;
detecting usage information corresponding to each of the devices in the set of devices, the usage information for the given device being indicative of usage of the applications installed on the given device;
generating a usage metric, for each given device, indicative of a level of usage of each of the applications installed on the given device;
dividing the plurality of different devices into clusters based on the inventory information and the usage metric corresponding to each of the plurality of different devices; and
generating a cluster control signal based on a user-selected cluster to control deployment functionality to perform the deployment operation on the devices in the user-selected cluster.

12. The computer implemented method of claim 11, and further comprising:
detecting collaboration information corresponding to each of the devices in the set of devices, the collaboration information for the given device being indicative of other devices in the set of devices that the given device performs collaborative operations with.

13. The computer implemented method of claim 12, wherein dividing the plurality of different devices into clusters comprises:
dividing the plurality of different devices into the set of clusters based on the collaboration information corresponding to each of the plurality of different devices.

14. The computer implemented method of claim 11, wherein identifying inventory information comprises:
accessing each of the devices in the set of devices to identify the inventory information.

15. The computer implemented method of claim 12, wherein detecting collaboration information comprises:
accessing an organization content graph to identify the collaboration information.

16. The computer implemented method of claim 11, wherein detecting usage information comprises:
generating a usage metric for each given device indicative of a level of usage of each of the applications installed on the given device and wherein dividing the plurality of different devices into clusters comprises dividing the plurality of different devices into clusters based on the usage metric.

17. The computer implemented method of claim 11, wherein detecting usage information comprises:
generating, as the usage information for each given device, information indicative of different functionality that is used on the given device.

18. The computer implemented method of claim 11, wherein identifying inventory information comprises:
identifying, as a portion of the inventory information for each given device, add-ins installed on the given device.

19. The computer implemented method of claim 11, and further comprising:
generating a deployment performance metric indicative of a deployment speed at which the deployment operation is performed on the devices in the user-selected cluster;
performing machine learning based on the deployment performance metric to obtain a machine learning result; and
modifying the clustering mechanism based on the machine learning result.

20. A computing system, comprising:
a processor;
deployment functionality that performs a deployment operation to deploy a computing component;
inventory detector logic that identifies inventory information corresponding to each device, of a plurality of different devices in a set of devices, the inventory information for a given device including an indication of applications installed on the given device;
a usage detector configured to:
detect usage information corresponding to each of the devices in the set of devices, the usage information for the given device being indicative of usage of the applications installed on the given device; and
generate a usage metric, for each given device, indicative of a level of usage of each of the applications installed on the given device;
a collaboration detector configured to detect collaboration information corresponding to each of the devices in the set of devices, the collaboration information for the given device being indicative of other devices in the set of devices that the given device performs collaborative operations with;
a clustering mechanism that divides the plurality of different devices into clusters based on the inventory information, the usage metric, and the collaboration information corresponding to each of the plurality of different devices; and
a cluster control signal generator that generates a cluster control signal based on a user-selected cluster to control the deployment functionality to perform the deployment operation on the devices in the user-selected cluster.

* * * * *